US011752528B2

(12) United States Patent
Cantrell et al.

(10) Patent No.: US 11,752,528 B2
(45) Date of Patent: Sep. 12, 2023

(54) IMMERSION SYSTEMS AND METHODS FOR WASHING AND PERFORMING OTHER TASKS

(71) Applicant: Immersion Systems, Inc., Topeka, KS (US)

(72) Inventors: John Cantrell, Prairie Village, KS (US); Richard Powers, Overland Park, KS (US); Roger Shealy, Fayetteville, GA (US)

(*) Notice: Subject to any disclaimer, the term of this patent is extended or adjusted under 35 U.S.C. 154(b) by 515 days.

(21) Appl. No.: 16/810,721

(22) Filed: Mar. 5, 2020

(65) Prior Publication Data

US 2020/0284515 A1    Sep. 10, 2020

Related U.S. Application Data

(60) Provisional application No. 62/924,459, filed on Oct. 22, 2019, provisional application No. 62/814,278, filed on Mar. 5, 2019.

(51) Int. Cl.
| | |
|---|---|
| *B08B 3/04* | (2006.01) |
| *A47L 15/28* | (2006.01) |
| *A47J 43/24* | (2006.01) |
| *A23L 3/365* | (2006.01) |

(52) U.S. Cl.
CPC ............ *B08B 3/045* (2013.01); *A47J 43/24* (2013.01); *A47L 15/28* (2013.01); *A23L 3/365* (2013.01); *B08B 3/047* (2013.01)

(58) Field of Classification Search
CPC .. B08B 3/04; B08B 3/047; B08B 3/10; B08B 3/045; A47J 43/24; A23L 33/365; A47L 15/28
See application file for complete search history.

(56) References Cited

U.S. PATENT DOCUMENTS

| | | | | |
|---|---|---|---|---|
| 2,857,923 | A * | 10/1958 | Zinty | B08B 3/045 68/156 |
| 3,497,445 | A * | 2/1970 | Berglund | C25F 7/00 204/287 |
| 3,888,694 | A * | 6/1975 | McKinney | B01D 46/74 134/32 |
| 10,112,221 | B1 * | 10/2018 | Pedziwiatr | B08B 3/12 |
| 2009/0252648 | A1 * | 10/2009 | Klein | A61L 2/186 422/292 |
| 2015/0007588 | A1 * | 1/2015 | Cantrell | A23L 3/365 62/56 |

* cited by examiner

*Primary Examiner* — Michael E Barr
*Assistant Examiner* — Kevin G Lee
(74) *Attorney, Agent, or Firm* — Kammer Browning PLLC

(57) ABSTRACT

Systems and methods for washing and thawing objects, such as vegetables and fruits, where large amounts of lifting of heavy items is minimized, complex and expensive pumping and manifold systems and structures are not required; and system cost and daily maintenance is reduced. The system includes a structure for holding a volume of fluid, a vertical motion structure driven by an electric motor or the like that raises and lowers a basket carrier between an elevated position and a lowered position. In the lowered position, one or more baskets are positioned on a basket carrier and are repeatedly lowered into and raised from the volume of fluid.

20 Claims, 9 Drawing Sheets

IMMERSION SYSTEMS AND METHODS FOR WASHING AND PERFORMING OTHER TASKS

CROSS REFERENCES TO RELATED APPLICATIONS

This application claims the benefit under Title 35 United States Code § 119(e) of U.S. Provisional Patent Application Ser. No. 62/814,278; Filed: Mar. 5, 2019 and U.S. Provisional Patent Application Ser. No. 62/924,459; Filed: Oct. 22, 2019, the full disclosures of which are incorporated herein by reference.

BACKGROUND OF THE INVENTION

1. Field of the Invention

The present invention relates generally to systems and methods for washing and thawing objects and masses of objects. The present invention relates more specifically to immersion systems and methods for washing various items and performing other tasks where the process of immersing the items in a body of fluids would have benefit.

2. Description of the Related Art

Systems currently available to clean items with fluids use complex pumping systems and manifolds to carry the fluids. These systems jet fluid into tanks where items are washed or treated in other ways. When food products are being washed or thawed all of the pump and manifold parts in such systems must be accessible for frequent cleaning (at minimum daily). This can take considerable time and effort as it typically requires the disassembly of such pumps and manifolds and the scrubbing out and disinfecting of such parts. This drives up the cost to acquire and implement such systems and increases the installation costs. In addition sanitation code compliance issues can and do arise.

Current systems also require operators to lift heavy loads of objects both up and out of the systems. This causes additional strain on an operator. Other systems use very expensive and complex machinery for hydraulically lifting and tilting the entire chamber for holding the items where items are then dumped into hoppers. This process can damage and bruise items and lifting is still required in order to remove the items from the hoppers. On these systems the containers or chambers for holding the items are normally fixed and therefore difficult to customize for specific targeted applications.

SUMMARY OF THE INVENTION

There exists a need for a system that can wash and thaw objects such as vegetables, fruits, sauces, soups and meat proteins where large amounts of lifting of heavy items is minimized, complex and expensive pumping and manifold systems and structures are not required, and system cost, daily maintenance is reduced, and sanitation code compliance is increased. It is contemplated that if such a system is developed it may have other beneficial applications where immersing other items into a body of fluids would have benefits.

DETAILED DESCRIPTION OF THE PREFERRED EMBODIMENTS

The present invention involves washing systems and methods that do not require complex pumping devices or manifolds, can be used as a self-contained system or with existing tanks for holding fluids (such as sinks), greatly minimizes lifting and daily maintenance and cleaning, and can be substantially less expensive to acquire and install. If each of the above objectives of the new and novel designs could be achieved virtually all of the shortfalls of the prior art would be overcome.

The fundamental elements of the present invention are implemented in self-contained systems (with the wash tank incorporated into the system) and in systems that utilizes existing fluid reservoirs and tanks as are commonly found in commercial kitchens. In each embodiment of the systems of the present invention, it is the automated and repeated action of immersing and withdrawing "product" from a fluid bath that achieves the desired results in the most efficient manner.

Operating in this manner, the systems and methods of the present invention solve most, if not all, of the problems associated with the prior art.

Figure 1:
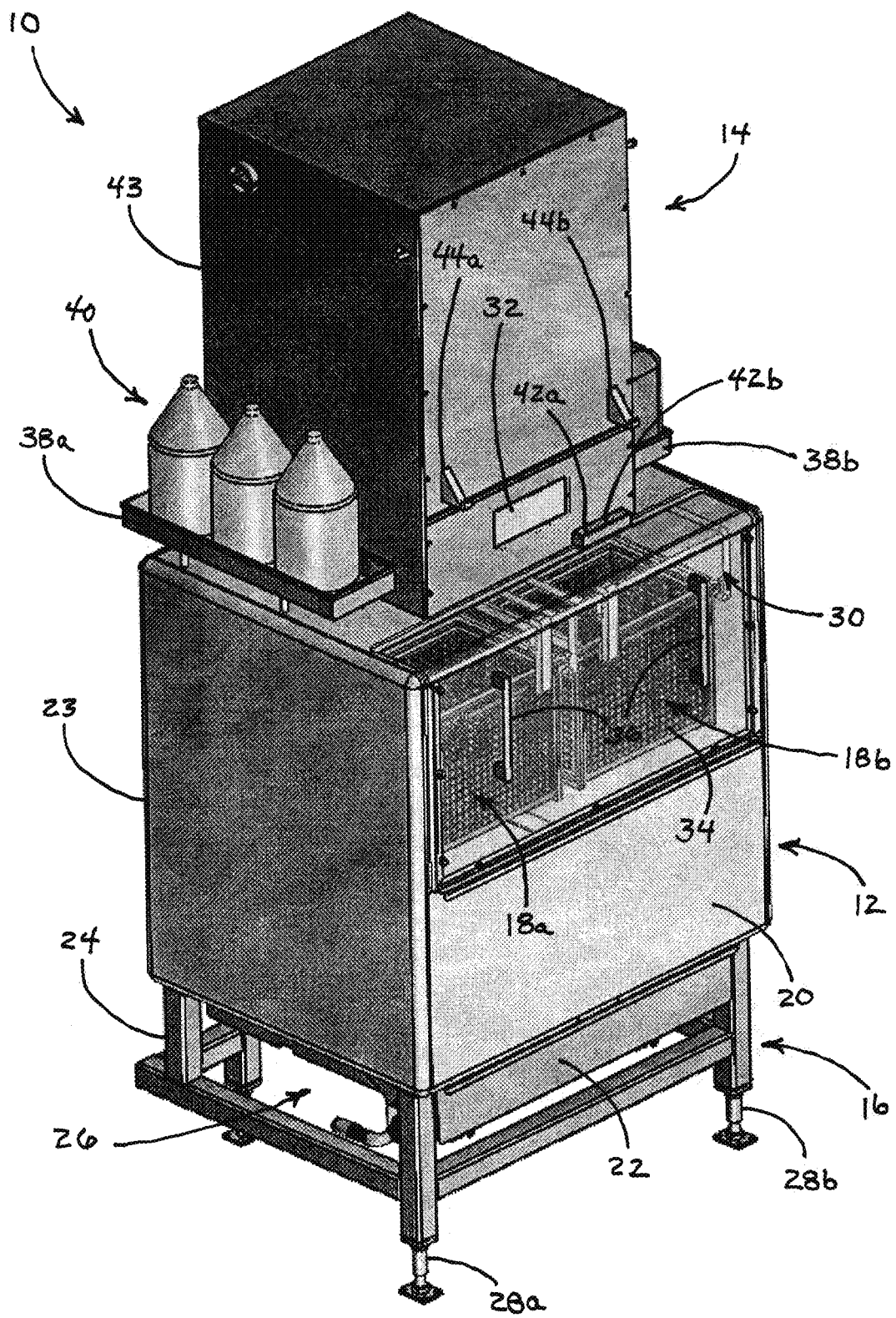
FIG. 1 is a perspective view of a self-contained embodiment of the present invention with product baskets raised and immersion chamber cover in place.

Reference is made first to FIG. 1 which is a perspective view of a self-contained embodiment of the present invention with product baskets raised and immersion chamber cover in place. This stand-alone immersion system 10 is generally constructed of three vertically stacked sub-systems. The base of the immersion system 10 positions water inlet, fluid flow & chemical systems 16 which primarily houses flow lines and valves typically with low voltage sensors and valve actuators. Above water inlet, fluid flow & chemical systems 16 is immersion chamber 12 which provides the physical volume to both hold the fluid into which product is immersed and support the porous containers (baskets) to receive and contain the product being handled. Above immersion chamber 12 is lift system 14 which houses the mechanics of the lifting and immersing system as well as the electrical power components and the electronic control components. This stacked arrangement of the three primary sub-systems not only optimizes access by the user but also puts all high voltage electrical components, and most all sensitive electronic components, above the wet environment of the immersion chamber 12 for purposes of safety and reliability.

Within immersion chamber 12 sub-system are positioned product basket, separator & lid assemblies 18a & 18b which are supported above fluid tank 20 within immersion chamber cabinet 23. In use, fluid tank 20 is filled with water or a water/chemical solution according to the function the system depending on what process it is operating in with the particular product held in product basket, separator & lid assemblies 18a & 18b. Fluid tank 20 is preferably filled automatically through an array of flowlines and control valves, again operated according to the specific functionality required. Additional details regarding the various functional actions the overall immersion system 10 takes during operation with specific products are provided below.

As indicated above, the flow of fluids into fluid tank 20 is generally accomplished by the flowlines & valves 26 positioned within water inlet, fluid flow & chemical systems 16. This sub-system that forms the base of the overall immersion system 10 is supported on base frame 24 which includes an array of leveling legs 28a-28d (28a & 28b visible in FIG. 1). Most control components in water inlet, fluid flow & chemical systems 16 are made accessible by being positioned in valve & chemical systems access drawer 22 which, in FIG. 1, is shown retracted fully into base frame 24. Additional flowlines and connectors are positioned within water inlet, fluid flow & chemical systems 16 below valve & chemical systems access drawer 22 and serve to connect the overall immersion system 10 to incoming water lines (not shown in FIG. 1) as well as chemical reservoirs 40 (described in more detail below).

Product basket, separator & lid assemblies 18a & 18b are vertically supported within immersion chamber 12 by product basket support structure 30. Access to product basket, separator & lid assemblies 18a & 18b is through an upper front opening in immersion chamber cabinet 23. In this preferred embodiment, the opening is covered during use by a removable transparent immersion chamber cover 34. Immersion chamber cover handles 36 allow the user to easily move immersion chamber cover 34 from a position closing off immersion chamber cabinet 23 during use, to a parking position against lift system cabinet 43.

When immersion chamber cover 34 is removed and parked, the user has access to product basket, separator & lid assemblies 18a & 18b for purposes of inserting product therein or removing product therefrom. In the parked position, immersion chamber cover 34 rests on immersion chamber cover support brackets 44a & 44b and is removably held to the front of lift system cabinet 43 through the interaction between immersion chamber cover magnet 42c and the immersion chamber cover which becomes magnetically attached to the front of the lift system 14 housing. With immersion chamber cover 34 in either position, user touch screen interface 32 remains visible and accessible to the user. As described in more detail below, this control display is preferably a touch screen display that allows the user to select and control the various automated functions of the immersion system.

Positioned on either side of lift system cabinet 43 are chemical reservoir shelves 38a & 38b which support a number of chemical reservoirs 40. As described below, various chemicals may be injected into the water flow associated with product washing functions and cleaning in place (CIP) functions. Flexible flowlines (not shown) will typically conduct chemical fluids from chemical reservoirs down to the water inlet, fluid flow & chemical systems 16 where the chemicals are selectively injected into the water flow. Positioning the chemical reservoirs 40 above the injectors in water inlet, fluid flow & chemical systems 16 allows gravity to assist with the flow of chemicals.

Immersion system 10, especially cabinets 23 & 43, is preferably constructed of stainless steel, as is typical of systems used in sanitary environments such as commercial kitchens and the like. Flow lines, valves, and injectors are preferably resistant to degradation over time from exposure to moderately caustic chemicals. Because the flow lines, valves, and injectors will periodically require cleaning and sanitizing, water inlet, fluid flow & chemical systems 16 is specifically structured with valve & chemical systems access drawer 22 to allow the user to position all such components for cleaning and sanitizing without the need to remove panels or otherwise take the system apart.

Figure 2:
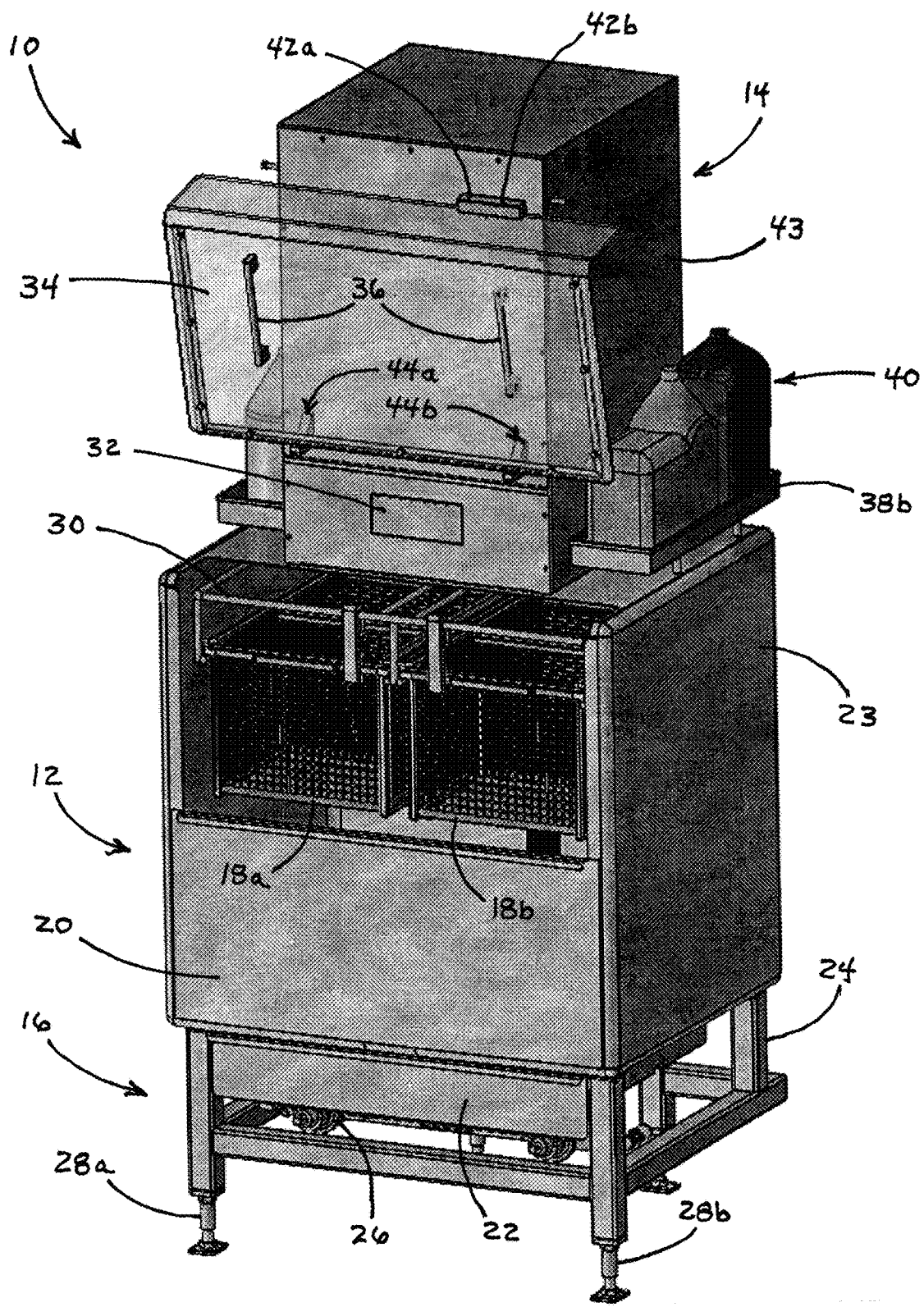
FIG. 2 is a perspective view of the self-contained embodiment of the present invention shown in FIG. 1 with product baskets raised and immersion chamber cover removed for product basket access.

Reference is next made to FIG. 2 which is a perspective view of the self-contained embodiment of the present invention shown in FIG. 1 with product baskets raised and immersion chamber cover removed and "parked" for product basket access. Once again, the stand-alone immersion system 10 is shown to be generally constructed of three vertically stacked sub-systems. Water inlet, fluid flow & chemical systems 16 houses flow lines and valves and forms the support base for the entire system. Above fluid flow system 16 is immersion chamber 12 which provides the volume of fluid tank 20 as well as the open volume above tank 20 where the porous containers (product basket, separator & lid assemblies 18a & 18b) are positioned to receive and support the product being handled. Positioned on top of immersion chamber 12, and connected internally through the operational mechanical linkages described below, is lift system 14 which houses the mechanics of the lifting and immersing system as well as the electrical power components and the electronic control components.

When immersion chamber cover 34 is removed and parked as shown in FIG. 2, the user has access to product basket, separator & lid assemblies 18a & 18b for purposes of inserting product therein or removing product therefrom. In this position, immersion chamber cover 34 rests on immersion chamber cover support brackets 44a & 44b. The immersion chamber cover 34 incorporates components 42a & 42b that interact with sensors in the cabinet (not visible in FIG. 2) to act first as an operational safety switch and second to confirm placement of the cover in the open parked position. Safety switch magnet 42*a* on immersion chamber cover 34 is detected in the cover closed position (see FIG. 1) by an aligned sensor within the lower portion of lift system cabinet 43. Immersion chamber cover sensor magnet 42*b* (which may be the same as or proximate to safety switch magnet 42*a*) on immersion chamber cover 34 is detected in the parked position (FIG. 2) by an internal sensor described below with FIG. 6. Once again, with immersion chamber cover 34 in the parked position, user touch screen interface 32 remains visible and accessible.

With immersion chamber cover 34 removed and parked as in FIG. 2, the components movably positioned within immersion chamber 12 sub-system are visible. Product basket, separator & lid assemblies 18*a* & 18*b*, which are supported above fluid tank 20 within immersion chamber cabinet 23, are held in position within immersion chamber 12 by product basket support structure 30. Access to product basket, separator & lid assemblies 18*a* & 18*b* is through this opening in immersion chamber cabinet 23 with the product baskets preferably constructed so as to slide forward and open to allow product to be placed into or removed from the baskets. While the preference is to have product baskets with at least porous bottoms and lids to facilitate vertical flow through, it is possible to optimize flow through rate for particular types of product where some walls of the product baskets are not as porous. In general, it may also be preferable for the product baskets to include porous lids and porous dividers that serve to separate the products. Immersion chamber cover handles 36 allow the user to easily move immersion chamber cover 34 from immersion chamber cabinet 23 during use, to the parked position on lift system cabinet 43 as shown in FIG. 2.

Figure 3:
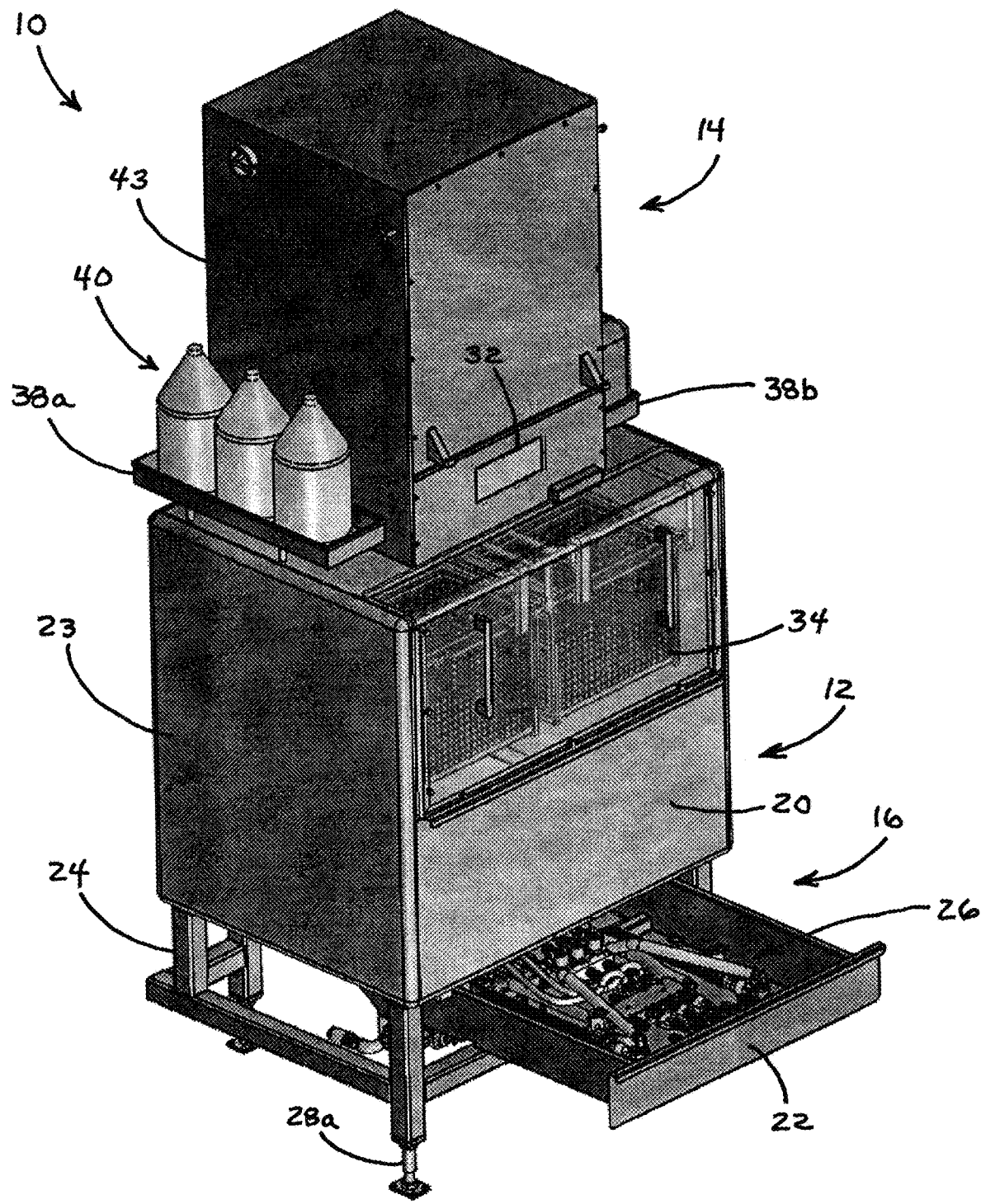
FIG. 3 is a perspective view of the self-contained embodiment of the present invention shown in FIG. 1 with product baskets raised, the immersion chamber cover in place, and the valve and chemical systems access drawer open.

FIG. 3 is a perspective view of the self-contained embodiment of the present invention shown in FIG. 1 with product baskets raised, the immersion chamber cover in place, and the valve and chemical systems access drawer open. As indicated above, the flow of fluids into fluid tank 20 is carried out by the flowline valves 26 positioned within water inlet, fluid flow & chemical systems 16. This sub-system that forms the base of the overall immersion system 10 is shown in FIG. 3 supported on base frame 24 which includes an array of leveling legs 28*a*-28*d* (28*a* visible in FIG. 3). Importantly, the flow and fluid composition control components in water inlet, fluid flow & chemical systems 16 are made accessible by being positioned in valve & chemical systems access drawer 22 which, in FIG. 3, is shown extended out from base frame 24. Additional flowlines and connectors are positioned within water inlet, fluid flow & chemical systems 16 below valve & chemical systems access drawer 22 and are connected by flexible flow lines (not visible in FIG. 3). These additional flowlines and connectors serve to connect the overall immersion system 10 to incoming water lines (not shown in FIG. 1) as well as chemical reservoirs 40 (described in more detail below).

The ready accessibility of the flow and fluid composition control components in water inlet, fluid flow & chemical systems 16 positioned in valve & chemical systems access drawer 22 not only facilitates cleaning and maintenance of the overall system but also provides the ability to customize the use of chemical additives within the water used in both the immersive washing operation and in the cleaning in place (CIP) operation. As described in more detail below with reference to FIG. 8, the valves, injectors, and flowlines associated with all operational functions of the system are arranged for easy access and identification in access drawer 22.

Figure 4:
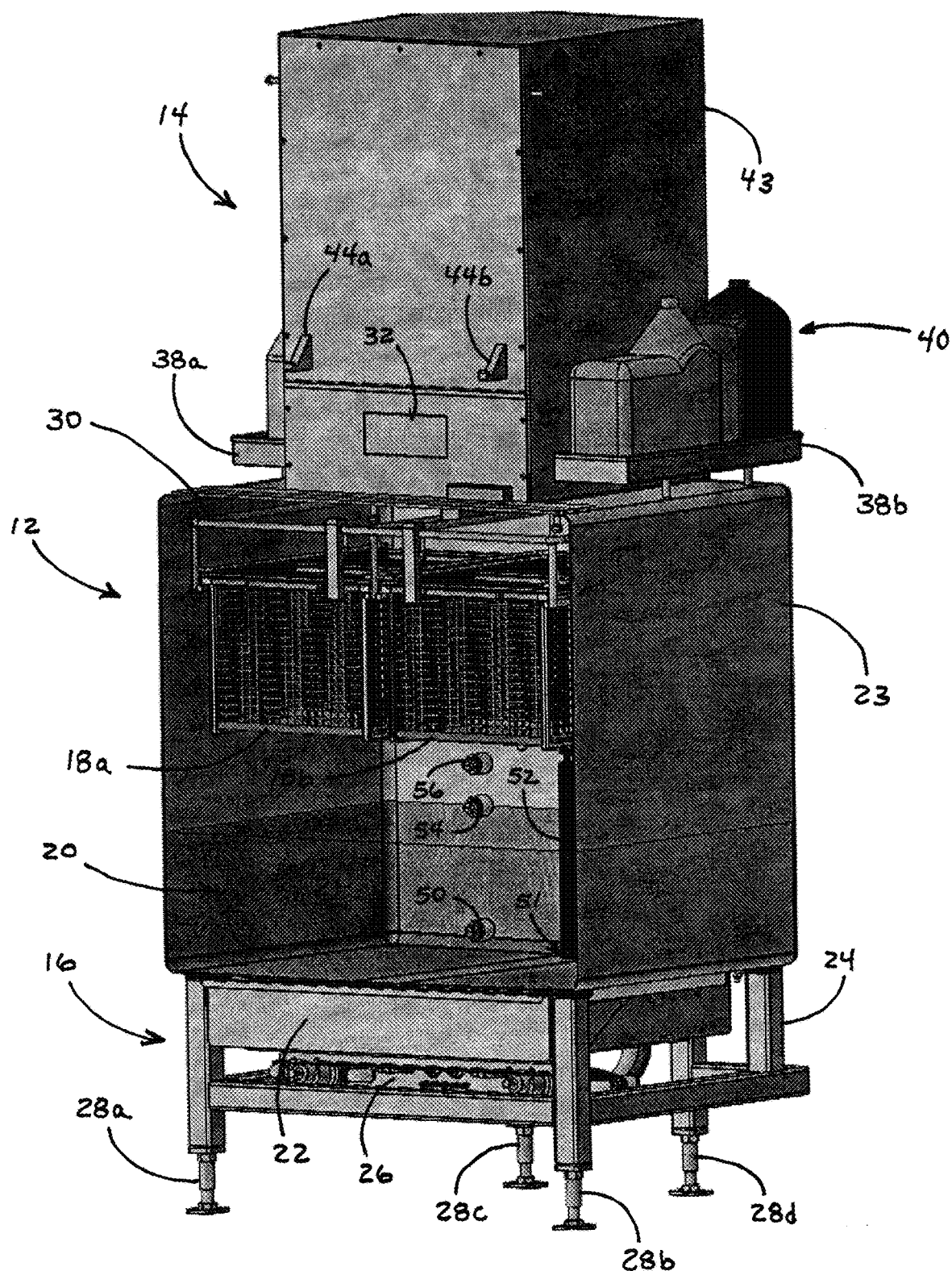
FIG. 4 is a partial cutaway perspective view of the self-contained embodiment of the present invention shown in FIG. 1 with product baskets raised, the immersion chamber cover removed, and the front of the immersion chamber removed for clarity.
Figure 5A:
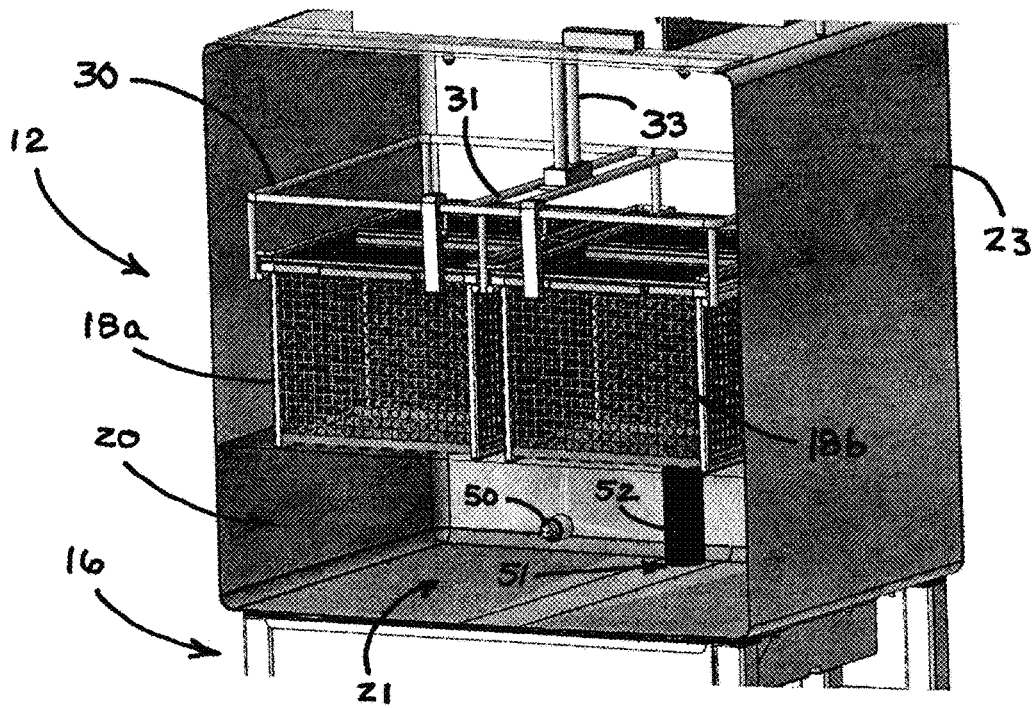
FIG. 5A is a partial cutaway perspective view of the immersion chamber portion of the self-contained embodiment of the present invention shown in FIG. 1 with product baskets raised to the level of the wash fluid and the front of the wash chamber removed for clarity.
Figure 5B:
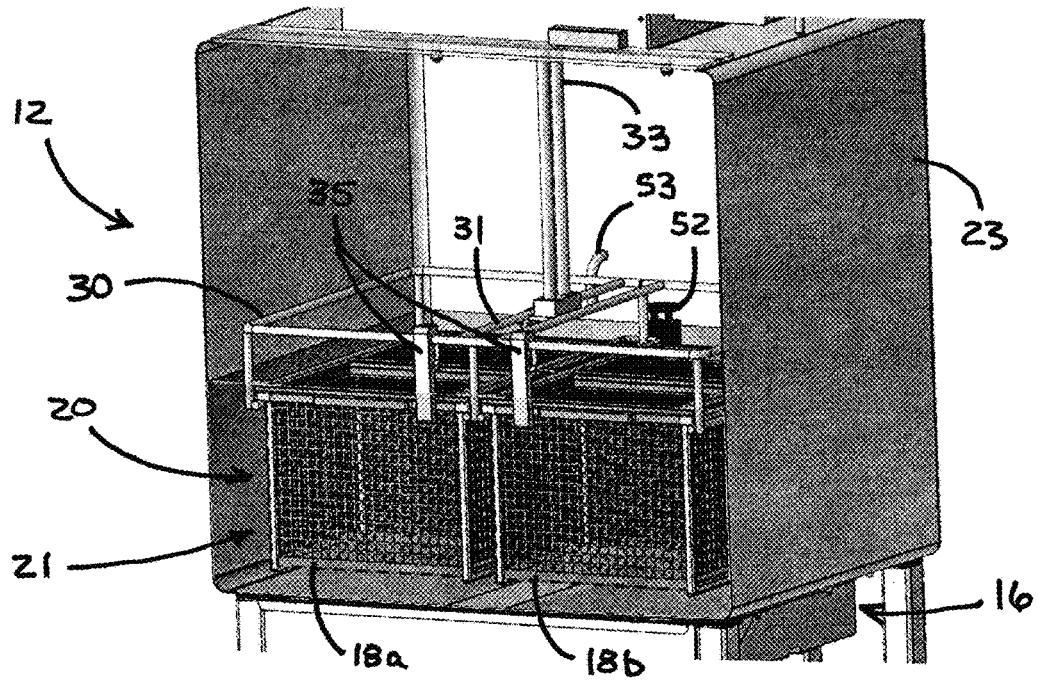
FIG. 5B is a partial cutaway perspective view of the immersion chamber portion of the self-contained embodiment of the present invention shown in FIG. 1 with product baskets lowered into to the wash fluid and the front of the immersion chamber removed for clarity.

Reference is next made to FIG. 4 which provides a partial cutaway perspective view of the self-contained embodiment of the present invention shown in FIG. 1 with product baskets raised, the immersion chamber cover removed, and the front of the immersion chamber removed for clarity. In combination with FIGS. 5A & 5B, FIG. 4 discloses the manner in which product positioned within product basket, separator & lid assemblies 18*a* & 18*b* is repeatedly (and automatically) immersed into and raised from wash fluid 21 held in fluid tank 20. FIG. 4 shows a first "load/unload" positioning of product basket, separator & lid assemblies 18*a* & 18*b*. FIG. 5A shows a second "top of cycle" positioning of product basket, separator & lid assemblies 18*a* & 18*b*. FIG. 5B shows a third "bottom of cycle" positioning of product basket, separator & lid assemblies 18*a* & 18*b*. Each programmed operation of the system takes the product baskets through these sequential positioning steps or portions of these steps.

As shown in FIG. 4, positioned within immersion chamber 12 sub-system are product basket, separator & lid assemblies 18*a* & 18*b* supported above fluid tank 20 within immersion chamber cabinet 23. Fluid tank 20 is filled with wash or thawing fluid 21 which comprises water or a water/chemical solution according to the function the system is operating through with the particular product being handled. As described above, fluid tank 20 is filled through an array of flowlines and control valves, again operated according to the specific functionality required. It is contemplated that the system can also be drained automatically by way of optional equipment and electromechanical systems.

Product basket, separator & lid assemblies 18*a* & 18*b* are held in position within immersion chamber 12 by product basket support structure 30. This support structure 30 is itself held in position by lifting rods (not visible in FIG. 4) that extend up into lift system 14. Control over the filling of wash fluid 21 within fluid tank 20 is facilitated by sensors and drains within the tank. Temperature, total dissolved solids & fluid low level sensor 50 is positioned near the bottom of fluid tank 20 to provide relevant information for the automated (or manual) filling of the tank. Temperature, total dissolved solids & fluid mid-level sensor 54 is positioned at what would typically be the surface of wash fluid 21 within fluid tank 20 to also provide relevant information for the operational readiness of the tank. Temperature, total dissolved solids & fluid high level sensor 56 is positioned at what would typically be just below the surface of wash fluid 21 within fluid tank 20 and primarily acts as a sensor to prevent overfilling of the system. Acting as a failsafe to an overfill event, standpipe overflow 52 is removably positioned over drain connection 51 within fluid tank 20. Overflow 52 also acts as an overflow drain when the fluid tank 20 is freshened and excess fluid must be drained out of fluid tank 20.

Once again, FIG. 5A shows the top of cycle positioning of product basket, separator & lid assemblies 18*a* & 18*b* while FIG. 5B shows the bottom of cycle positioning. FIG. 5A is a partial cutaway perspective view of the immersion chamber portion of the self-contained embodiment of the present invention shown in FIG. 1 with product baskets raised to the level of the wash fluid and the front of the wash chamber removed for clarity. In this view, product basket, separator & lid assemblies 18*a* & 18*b* are more clearly shown as they are positioned on product basket support structure 30. This support structure 30 is an open frame structure designed to slidingly receive and retain product basket, separator & lid assemblies 18*a* & 18*b* from the front of the assembly.

Support structure 30 includes product basket support structure cross member 31 by which it is held in position (and raised and lowered) by lifting rods 33 that extend up into lift system 14. Temperature, total dissolved solids & fluid low level sensor 50 is also seen in FIG. 5A positioned near the bottom of fluid tank 20, as are drain 51 and standpipe overflow 52. These components (as well as sensors 54 & 56 not visible in FIG. 5A) are positioned at the rear of fluid tank 20, well away from product basket, separator & lid assemblies 18a & 18b and their associated support structure 30, whether in the elevated positions shown in FIGS. 4 & 5A or the lowered position shown in FIG. 5B.

FIG. 5B is also a partial cutaway perspective view of the immersion chamber portion of the self-contained embodiment of the present invention shown in FIG. 1, but in this view the product baskets are fully lowered into to the wash fluid. In this view, product basket, separator & lid assemblies 18a & 18b are again clearly shown as they are positioned on product basket support structure 30. Support structure 30 includes product basket support structure cross member 31 that is secured to the lower end of lifting rods 33 that extend up into lift system 14. In FIG. 5B, lifting rods 33 have been further lowered into immersion chamber 12 from their upper end connection within lift system 14 (see FIG. 6 described below).

Also visible in FIG. 5B is fluid tank fluid inlet 53 which, like level sensors 50, 54 & 56 and standpipe overflow 52, is positioned near, on or through the back wall of immersion chamber cabinet 23 where it will not interfere with the travel of product basket, separator & lid assemblies 18a & 18b. Further identified in FIG. 5B are product basket retention clips 35 that serve to prevent product basket, separator & lid assemblies 18a & 18b from sliding or lifting out of support structure 30. Retention clips 35 may be easily flipped out of the way by the user when accessing the baskets for the purpose of inserting or removing product. In the preferred embodiment product basket, separator & lid assemblies 18a & 18b may be slid entirely out from support structure 30 where they may be filled or emptied of product outside of the system 10. In this manner, as many as four or six removable product basket, separator & lid assemblies may be inserted into and supported by support structure 30. While the height and width of these basket assemblies may be fixed by the height of the immersion tank (and the vertical travel of the system) and the width of the support structure, the depth (into the cabinet) of each assembly can vary according to whether there is one (one that spans the entire support structure 30), two (one on each side of the support structure 30), four (two on each side), or six (three on each side). Larger systems could, of course, accommodate additional basket assemblies. Smaller systems could, of course, utilize a single basket assembly.

Figure 6:
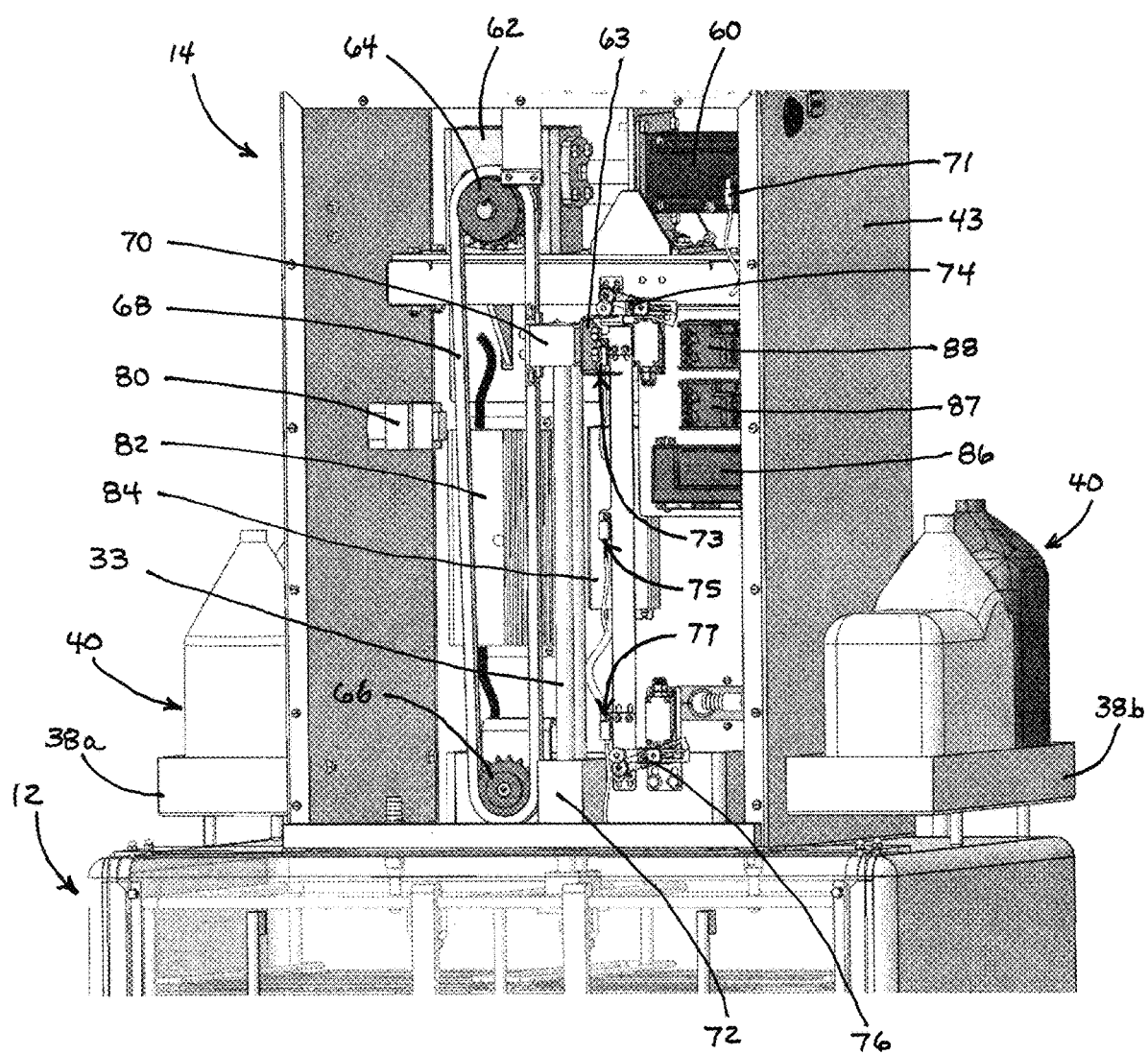
FIG. 6 is a perspective view of the interior of the lift system portion of the self-contained embodiment of the present invention shown in FIG. 1 with the front of the lift system cabinet removed for clarity.

FIG. 6 is a perspective view of the interior of the lift system portion of the self-contained embodiment of the present invention shown in FIG. 1 with the front of the lift system cabinet removed for clarity. Lift system 14 is positioned above immersion chamber 12 with an opening between that allows for the passage of lifting rods 33 between the two cabinets. As indicated above, the positioning of lift system 14 maintains all high voltage electrical elements and most low voltage components above and removed from the wet environment of immersion chamber 12. Low voltage control lines that extend down to water inlet, fluid flow & chemical systems 16 pass external to immersion chamber 12 and require no extraordinary waterproofing as would be required with higher voltage conductors.

Within lift system cabinet 43 are the mechanical, electrical, and electronic components that produce the vertical motion of lifting rods 33 and therefore the cyclic immersion and extraction of product from the wash fluid in the fluid tank. Lifting rods 33 extend from lifting rod head 70, through lifting rod guide & bushing 72, to a point of fixed attachment on product basket support structure cross member (see 31 in FIGS. 5A & 5B). Lifting rod head 70 is fixed to a point on drive chain/belt 68 and therefore raises and lowers lifting rods 33 as drive chain/belt 68 moves. Drive chain/belt 68 fits around follower sprocket 66 and gear box drive sprocket 64. Drive sprocket 64 rotates on the output axis of gear box 62 which in turn is driven on its input axis by drive motor 60. Drive motor 60 is preferably a DC step motor capable of accurately and incrementally moving drive chain/belt 68 in either direction. The necessary torque required for lifting the modest loads (product contained within the product basket assemblies) can more than adequately be achieved through appropriate gear reduction through the gear box 62.

Fixed to the back side (the side opposite its attachment to drive chain/belt 68) of lifting rod head 70, are sensor magnet 63 and a travel limiting switch contact arm. Sensor magnet 63 interacts with three linearly spaced sensors 73, 75 & 77 along the vertical path of the lifting rod head 70 as the lifting rods 33 move. Load unload position sensor 73 marks the uppermost normal travel of the system with the product basket, separator & lid assemblies 18a & 18b positioned for loading or unloading product. Top of cycle sensor 75 and bottom of cycle sensor 77 mark the upper and lower travel limits for the cyclic immersion and extraction of the product basket, separator & lid assemblies 18a & 18b during normal immersion operation. These sensors 73, 75 & 77 inform the controller of the positioning of the product during operation and facilitate such motion through preprogrammed procedures specific to the various tasks the system is capable of A similar magnetic sensor, immersion chamber cover sensor 71, is positioned to detect when the immersion chamber cover (not shown in FIG. 6) is in the parked position as described above. A further sensor (not visible in FIG. 6) is positioned internally near the interface between immersion chamber 12 and lift system 14 to detect when the immersion chamber cover is in place as with operational use of the system.

Also positioned adjacent to the extreme ends of travel for lifting rod head 70 are upper limit overtravel switch 74 and lower limit overtravel switch 76. Beyond simply identifying position, these switches 74 & 76 prevent the motor from driving the drive chain/belt beyond its safe limits. In addition to the above described mechanical and electromechanical components positioned with lift system cabinet 43, there are a number of electrical and electronic components that power and control the operation of the system. Power convertors 82 & 84 provide the necessary AC to DC conversion to power the DC motor, the valve actuators, and the electronics associated with the programmable microcontrollers within the system. Emergency power cut off switch 80 is also provided and is accessible to the user from outside of lift system cabinet 43.

Control of the operation of the overall system is achieved through the use of universal programmable controller 86, motor controller/pressure sensor module 88 and power cut off relay module 87. Universal programmable controller 86 operates in response to preprogrammed routines and user input from the user touch screen interface (not shown in FIG. 6). Universal programmable controller 86 further receives sensor input from each of the various mechanical, magnetic, and chemical sensors described above and below. Universal programmable controller 86 further directs the operation of drive motor 60 as well as the operation of the various valve actuators within the system through controller modules 87 & 88.

There is generally little need for user access to the above described components within lift system cabinet 43. Other than during cleaning in place (CIP) operation, no water, fluids, or chemicals flow within the closed lift system cabinet 43, with the only exchange with the wet environment of the immersion chamber being the movement of the "dry" portion of the lifting rods 33 up into the cabinet. Lifting rod guide/bushing 72 serves to minimize moisture travelling up into the cabinet with the movement of the rods. Although chemical reservoirs 40 are positioned on chemical reservoir shelves 38a & 38b adjacent the cabinet, the flow lines from these reservoirs are external to the cabinet and travel down the back and/or the external sides of the system to the chemical injectors positioned in the water inlet, fluid flow & chemical systems 16 near the base of the unit.

Figure 7:
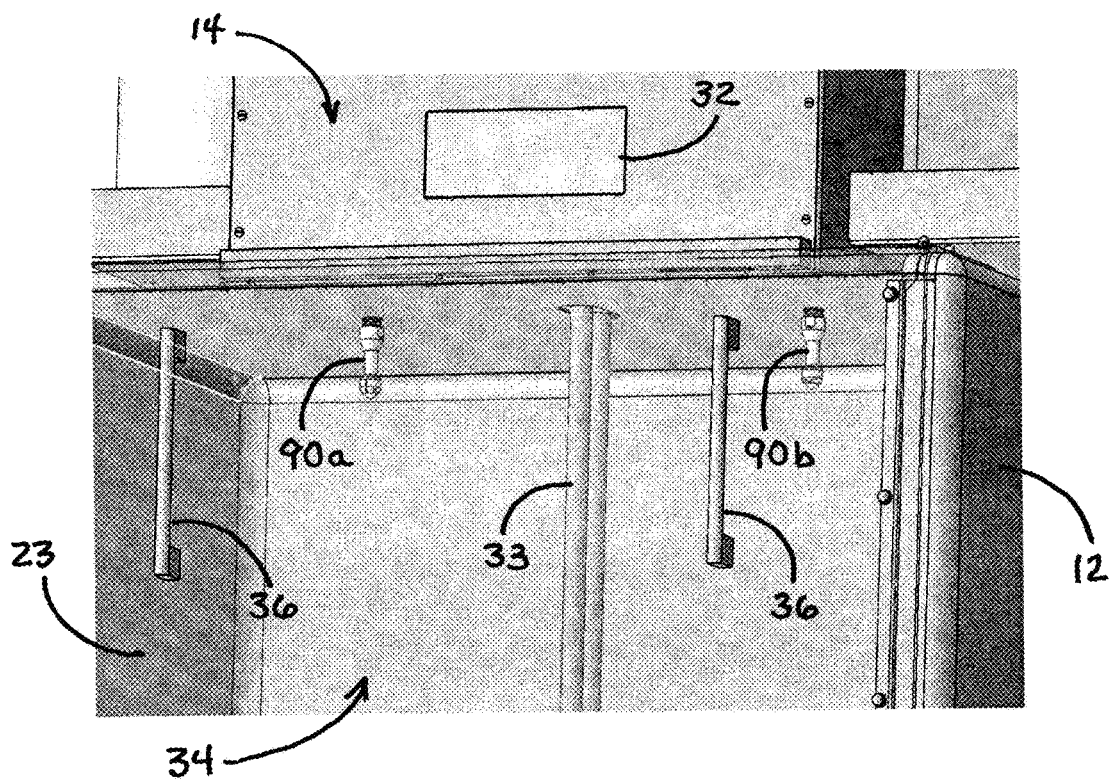
FIG. 7 is a detailed perspective view of the upper immersion chamber portion of the self-contained embodiment of the present invention shown in FIG. 1 with product baskets lowered out of view for clarity.

FIG. 7 is a detailed perspective view of the upper immersion chamber portion of the self-contained embodiment of the present invention shown in FIG. 1 with the product baskets lowered out of view for clarity and discloses a few additional components in the system specifically related to the cleaning in place (CIP) functionality. At the interface between immersion chamber 12 and lift system 14 is where CIP (clean in place) nozzles 90a & 90b are positioned and extend into immersion chamber 12 (the upper part of immersion chamber cabinet 23). Operation of the CIP functionality would, of course, occur with immersion chamber cover 34 (fitted with immersion chamber cover handles 36) as shown in FIG. 7. CIP functionality may be carried out with or without product basket, separator & lid assemblies 18a & 18b in place and with the product basket support structure 30 in any position within the chamber including actively cycling up and down.

Figure 8:
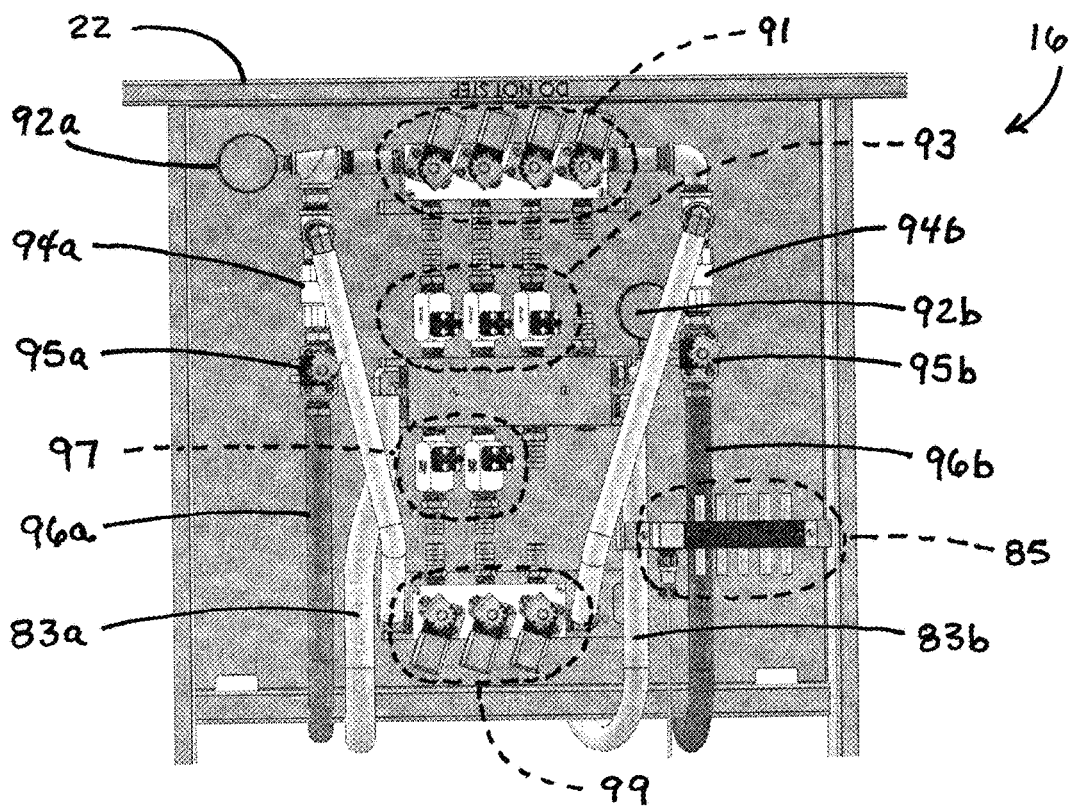
FIG. 8 is a detailed plan view of the water inlet, fluid flow and chemical systems of the self-contained embodiment of the present invention shown in FIG. 1 with some connecting water and chemical flow lines removed for clarity.

Reference is next made to FIG. 8 for a detailed plan view of the water inlet, fluid flow and chemical systems of the self-contained embodiment of the present invention shown in FIG. 1 with some connecting water and chemical flow lines removed for clarity. As indicated above, most of the water and chemical flow lines of the system are collected well away from the electrical and electronic components of the system, predominantly in the water inlet, fluid flow & chemical systems 16, and more specifically within valves & chemical system access drawer 22. In the orientation of FIG. 8, the external drawer face is positioned at the top of the drawing with the flow lines that are represented in the figure extending to the back and below the drawer.

There are basically two incoming and two outgoing water lines in water inlet, fluid flow & chemical systems 16. Hot water line 96a and cold water line 96b are ultimately connected to standard external hot and cold water sources and bring water into the system in a controlled manner through electrically actuated hot water valve 95a and cold water valve 95b. Check valves 94a & 94b protect the internal flow system. Pressure regulators 156 and 162 in FIG. 10 (not shown here) are included ahead of hot water valve 95a and cold water valve 95b and preferably include strainers to reduce the accumulation of particulates and debris within the system. CIP (clean in place) nozzle fluid line 83a and immersion chamber wash fluid line 83b distribute water (and chemicals in solution as necessary) out from water inlet, fluid flow & chemical systems 16.

CIP (clean in place) system valves 91 direct an isolated or combined flow of hot and/or cold water through CIP (clean in place) chemical injectors 93 (if called for in the specific operation) and then out through CIP (clean in place) nozzle fluid line 83a. In a similar manner, immersion chamber system valves 99 direct an isolated or combined flow of hot and/or cold water through immersion chamber wash fluid chemical injectors 97 (if called for in the specific operation) and then out through immersion chamber wash fluid line 83b. Each of the two sub-systems provides for "pure" water flow, if desired, bypassing the respective chemical injectors. Water pressure sensor/transducer 92a monitors line pressure at the inlet of the hot and cold water lines while CIP (clean in place) pressure gauge 92b monitors line pressure at the outlet of the CIP fluid flow (directed to the CIP nozzles 90a & 90b as described above).

Each of the valves within valve banks 91 & 99 are electrically actuated and controlled by the system controller as described above. Each of the chemical injectors within injector banks 93 & 97 are passively actuated when the corresponding valve is actuated. The short flow lines connecting the valves and injectors have been omitted in FIG. 8 for clarity although the alignment of each valve with a respective injector makes clear the flow line connection. As indicated above, a flow line connection for each of the sub-systems (CIP and wash) is provided that bypasses the injector banks to provide direct water flow into the system.

Chemical flow lines have also been omitted for clarity in FIG. 8 but involve a number of inlet tubes or lines (five in the embodiment shown in FIG. 8) that bring the respective chemical concentrated solutions from the chemical reservoirs 40, through chemical sensor module 85, to the individual chemical injectors within injector banks 93 & 97. Chemical sensor module 85 is an optical sensor that detects and confirms the flow of a specific chemical concentrate through the module to the respective injector. As indicated above, such chemical flow only occurs when a specific valve directs a flow of water through a paired injector, eliminating the need for chemical solution pumps or valves. In this manner, the system shown in FIG. 8 only passes pure water through the valves in the system, eliminating the need to more frequently clean and maintain the valves that would normally clog and degrade over time with the passage of sometimes harsh chemical solutions therethrough.

Figure 9A:
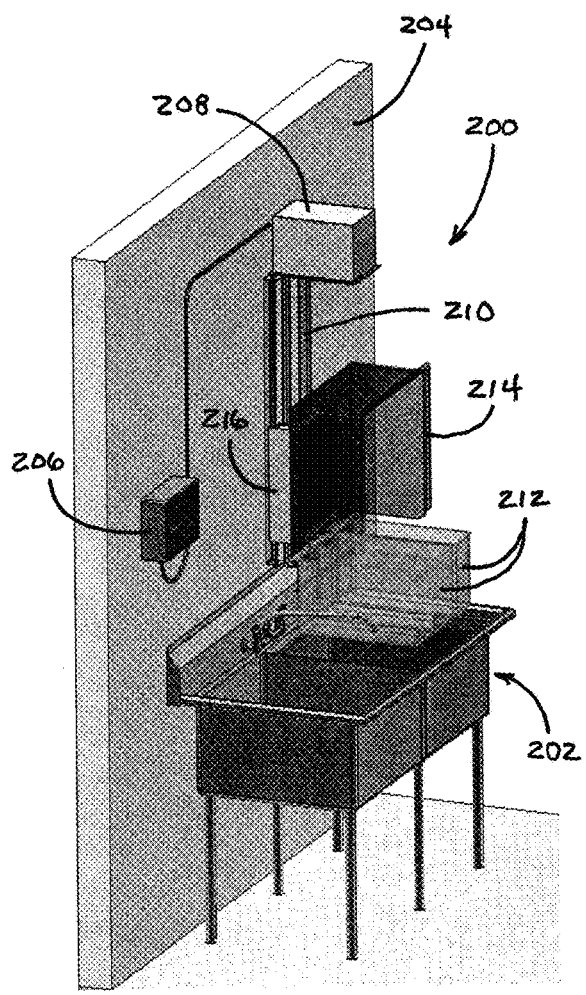
FIG. 9A is a perspective view of an alternate embodiment of the present invention utilized with an existing water tank/basin with the product baskets in a partially raised position and the product basket cover open.
Figure 9B:
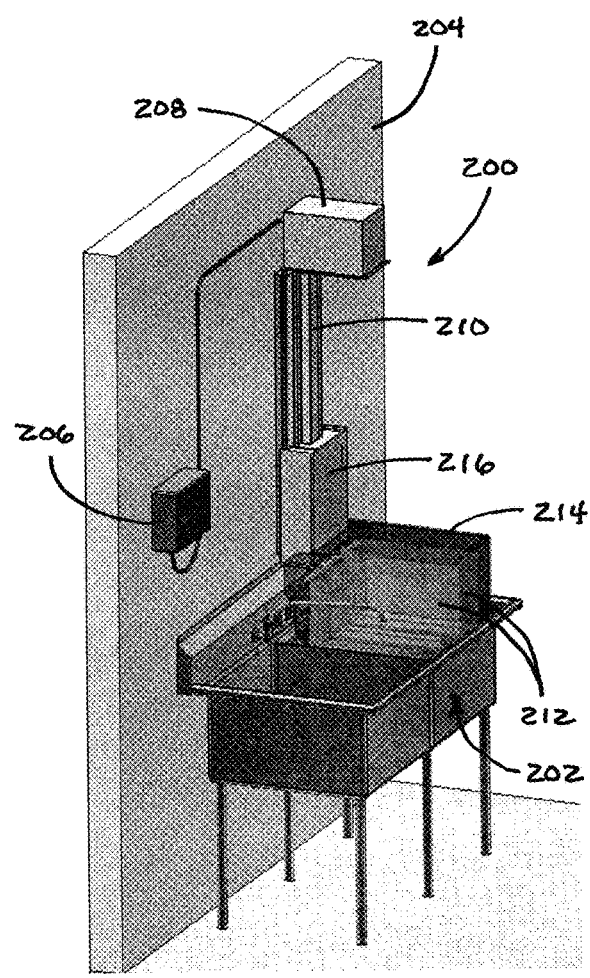
FIG. 9B is a perspective view of the alternate embodiment of the present invention shown in FIG. 9A with the product baskets positioned at water level with the basket cover closed.

The standalone, self-contained, immersion system shown and described in FIGS. 1-8 provides the most versatile and customizable implementation of the basic cyclic immersion and extraction functionality of the present invention. There are, however, some environments where it might be preferable to implement this same basic functionality in connection with an existing fluid tank or container (such as a commercial kitchen sink). FIGS. 9A & 9B show such an embodiment of the present invention where the lift system is implemented in association with an existing open sink structure. This alternate embodiment provides components that, in combination with the existing tank or sink, create an immersion chamber similar to the immersion chamber of the first preferred embodiment described above.

FIGS. 9A & 9B are perspective views of an alternate embodiment of the present invention utilized with an existing water tank/basin. FIG. 9A shows the assembly in a condition with the product baskets in a partially raised position and the product basket cover open. In this condition, product may be inserted into (or removed from) the product baskets. FIG. 9B shows the assembly in a condition with the product baskets positioned at water level with the basket cover closed ready to be immersed.

Immersion system 200 in this alternate preferred embodiment is installed in association with existing tank/basin 202 by mounting the system on a facility wall 204 behind and above the existing tank/basin 202. In this arrangement, electrical power source 206 provides power to lift system 208 positioned at the high point of the system, well above the wet environment of the immersion tank. Although the same lifting rods arrangement of the first preferred embodiment could be implement here, a preferable arrangement is shown that includes a carriage that moves up and down on a rail or track mounted to the wall. Product baskets 212 are removably attached to basket carriage 216 and basket cover 214 is hinged to the basket carriage 216 at or near the same support point. The same three basic positions for the product baskets 212 are defined in the second preferred embodiment as in the first. A first load/unload position is shown in FIG. 9A wherein basket cover 214 may pivot from being open or closed. A second top of cycle position is shown in FIG. 9B wherein basket cover 214 is closed and the product baskets 212 are poised just above the fluid surface in existing tank/basin 202. A third bottom of cycle position (not shown) would have basket cover 214 closed and the product baskets 212 fully immersed into the fluid contained in existing tank/basin 202. An optional fourth parking position (not shown) is preferable in this second system embodiment that positions basket carriage 216 with basket cover 214 (and with or without product baskets 212) in a fully elevated position that allows greater access to existing tank/basin 202 for normal use of the sink.

Such a system as shown in FIGS. 9A & 9B can be fully mounted to a structure in proximity of a tank for holding fluids such as a sink which is shown in the illustration. The mechanical system is on a set of guides and can travel upward and downward. When not in use (the "Stop Mode") the mechanical system travels up the guides into a "parked mode" so that it is out of the way and the tank for holding fluids can be fully accessed and used for any of its myriad of other uses. When in use (the "Run Mode") the system travels down the guides and locks in place. The mounting location of the system on the wall is determined based on the location of the bottom surface of the tank for holding fluids.

A vertical structure that is associated with the mechanical system and further associated with a permeable structure for holding a mass of objects enables the mechanical system to raise and lower the mass of objects into and out of a body of fluids. This can be done at varying speeds and varied cycles based on the task being performed. The action of immersing the mass of objects into and out of the mass of fluids creates a powerful and comprehensive wash action as fluid rushes up into and through the mass of objects and then via gravity rushes out of the mass of fluids. During this process objects are moved and rearranged by the flow of the fluids and being momentarily levitated by that flow of fluids. Depending on the buoyancy of the objects this process can occur in both movement directions. In a preferred embodiment, the entire process of raising and lowering the entire system and raising and lowering the items into and out of the body of fluids is performed and enabled by a variable speed, reversible DC motor which is geared and associated with a sprocket system and a belt or chain drive. This preferred embodiment is further associated with a programmable controller and the above noted vertical structure and permeable structure for holding objects. It is contemplated that further embodiments could employ custom sizes and a multiplicity of permeable structures for holding objects. It is also contemplated that the system would employ safety sensors that would shut the system down to protect the operator.

Stored Position: When the system is not in use (the "Stop Mode") the system travels up the wall to a position that is high enough up that it is out of the way. In this mode the structure for holding fluids (a sink in this illustration) can be used for any other task it might normally be used for.

Assembled Position & Unload Position (FIG. 9A): In this position the cover is moved to the "open position" and a permeable structure for holding a mass of objects can be unloaded. In other embodiments there may be multiple permeable structures for holding multiple masses of objects.

Operating Position with Baskets Raised (FIG. 9B): In this position or mode the system cover is shut and the permeable structure(s) for holding a mass of objects is (repeatedly) raised out of the body of fluid.

Operating Position with Baskets Submerged: In this position or mode the system cover is shut and the permeable structure(s) for holding a mass of objects is (repeatedly) lowered into the body of fluid.

Operating Position with Baskets Removed: In this position or mode the system cover is lowered but open (on a hinge structure) and the permeable structure(s) for holding a mass of objects are removed from the system by detachment from the basket carrier.

Movement from Operating to Storage Position: In this transitional position or mode the system cover is initially lowered and pivoted down but begins the transition to a pivoted up and raised condition, traveling up the guides to return to the storage condition.

Figure 10:
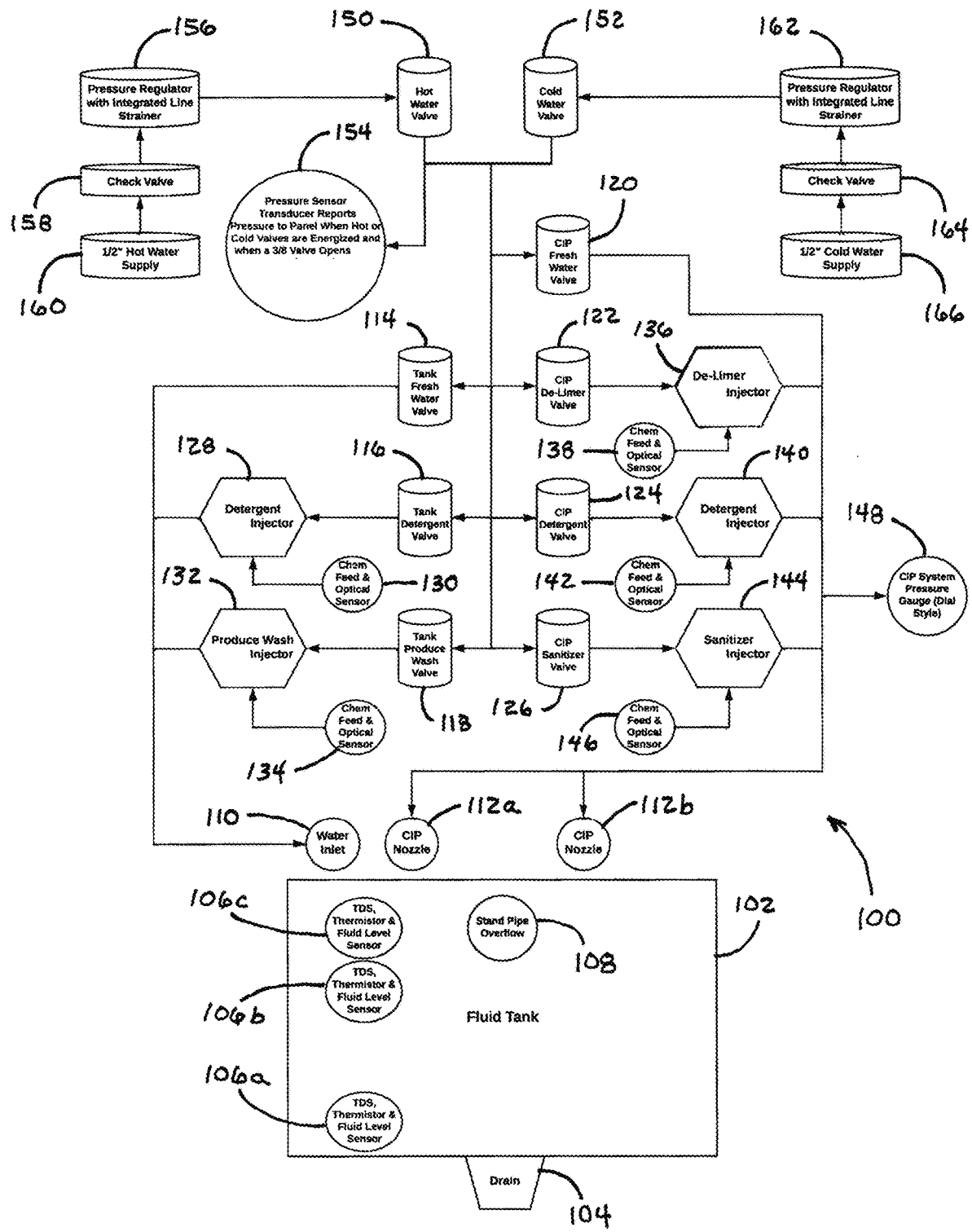
FIG. 10 is a schematic block diagram of the water inlet, fluid flow and chemical systems of the present invention, generally tracking the structures shown in FIG. 8.

Reference is finally made to FIG. 10 which is a schematic block diagram of the water inlet, fluid flow and chemical systems of the first embodiment of the present invention, generally tracking the structures shown in FIG. 8. In this schematic block diagram form the figure provides the essential functionality of the water and chemical flow processes of the system of the present invention. With the arrays of sensors and electronically actuated valves the system facilitates both manual operation and automated operation according to a wide range of preprogrammed routines in both the product handling mode and the cleaning in place (CIP) mode.

Water Inlet, Fluid Flow & Chemical Systems 100 as schematically set forth in FIG. 10, utilizes fluid tank 102 with fluid tank drain 104 (manual or controlled). Preferably included in fluid tank 102 are: temperature, total dissolved solids & fluid low level sensor 106a; total dissolved solids & fluid mid-level sensor 106b; and total dissolved solids & fluid high level sensor 106c. Stand pipe overflow 108 is also included in fluid tank 102 and may be separate from or incorporated with fluid tank drain 104.

Two fluid inlet or fill functions are provided into fluid tank 102. Fluid tank fluid inlet 110 provides the water or water/chemical solution called for in any of the product immersion handling functions of the system (washing, rinsing, deicing, thawing, etc.). CIP (clean in place) nozzles 112a & 112b provide the water or water/chemical solution called for in any of the CIP functions of the system. In general, the product immersion handling functions of the system are shown on the left side of FIG. 10 (above water inlet 110) with the CIP functions shown on the right side (above CIP nozzles 112a & 112b).

Water flow with or without chemical injection is, as described above, generally controlled by activation of various specific valves. Water into the system is provided as hot and cold sourced from hot water supply 160 and cold water supply 166. Check valves 158 & 164 are provided on the hot and cold water supplies respectively. Likewise, pressure regulator/line strainers 156 & 162 are provided on each of the hot and cold water supplies respectively. Flow of hot water into the system is controlled by hot water valve 150 while flow of cold water into the system is controlled cold water valve 152. Once again, these flow control valves are preferably electrically actuated valves. The hot and cold water flowlines combine downstream of the inlet control valves giving the system the ability to run with hot water or cold water or both. Water pressure sensor/transducer 154 is positioned downstream of the inlet control valves 150 & 152 to monitor inlet water pressure. A separate CIP system pressure gauge 148 is preferably used on the CIP side of the system to insure enough water pressure through the CIP nozzles 112a & 112b.

On the product handling side of the system 100 there are preferably three control valves for directing fluid flow towards fluid inlet 110. Tank fresh water valve 114 allows fresh water to flow directly into fluid tank 102. Fresh water may be preferred for use with any of a number of functional modes including rinsing, thawing, deicing, and certain sensitive washing functions. Tank detergent valve 116 directs water to flow through tank detergent chemical injector 128 (fed by tank detergent chemical feed 130) before flowing into fluid tank 102. As the name implies, a water/detergent solution may be preferred for use with non-food wash functions. Tank produce wash valve 118 directs water to flow through tank produce wash chemical injector 132 (fed by tank produce wash chemical feed 134) before flowing into fluid tank 102. A water/produce wash solution would be preferred for edible produce or other food products and could vary according to the specific chemicals accepted for food grade wash systems.

On the clean in place (CIP) side of the system 100 there are preferably four control valves for directing fluid flow towards CIP nozzles 112a & 112b. CIP fresh water valve 120 allows fresh water to flow directly through CIP nozzles 112a & 112b into the system. Fresh water may be preferred for use with any of a number of CIP functional modes including a final rinse after detergent cleaning. CIP de-limer valve 122 directs water to flow through CIP de-limer chemical injector 136 (fed by CIP de-limer chemical feed 138) before flowing through CIP nozzles 112a & 112b into the system. As the name implies, a water/de-limer solution may be preferred for use with hard water environments to reduce mineral buildup. CIP detergent valve 124 directs water to flow through CIP detergent chemical injector 140 (fed by CIP detergent chemical feed 142) before flowing through CIP nozzles 112a & 112b into the system. As the name implies, a water/detergent solution may be preferred for use with overall system component CIP wash functions. Finally, CIP sanitizer valve 126 directs water to flow through CIP sanitizer chemical injector 144 (fed by CIP sanitizer chemical feed 146) before flowing through CIP nozzles 112a & 112b into the system. Again as the name implies, a water/sanitizer solution may be preferred for use with final step CIP sanitizing functions.

The functionality set forth in schematic form in FIG. 10 may be implemented in whole or in part in any of the preferred embodiments of the present invention. The methods for passively injecting chemicals into water flow streams allow the system to function without complex chemical pumps and the like. By controlling fluid composition (with both the product handling and CIP functions) with separate electrically actuated valves the present invention eliminates much of the maintenance and repair typically required of such systems.

The methods of the present invention therefor involve the highly efficient immersion process as well as the reliable and efficient water/chemical solution control process. The basic process method for product handling (washing, deicing, rinsing, etc.) involves the steps of: (a) filling the fluid tank with the desired water or water/chemical solution; (b) positioning the product carrier assembly in a load/unload position; (c) loading product into the product carrier assembly; (d) lowering the loaded product carrier assembly into the filled fluid tank, thereby immersing the product in the fluid; (e) lifting the loaded product carrier assembly up from the filled fluid tank; and (f) repeating the lowering and lifting steps as needed.

The automated controls of the present invention as described above allow for controlled variations in the rapidity of the immersion and removal actions (which varies the force on the product by the fluid as the product passes through) as well as the number of repetitions. Programmed control can provide specific sequencing of different motion rates and repetitions. For example, the system might carry out an initial soak, pausing the motion after the product is immersed, before proceeding with a more rapid immersion/extraction cycling.

The automated controls of the present invention related to water temperature and chemical solution content add further versatility to the functionality and the many processes that the system can carry out. Optimal combinations of temperature, chemical content, motion speed, time and repetitions allow for highly efficient procedures for a myriad of different products.

Although the present invention has been described in conjunction with a number of preferred embodiments, those skilled in the art will recognize modifications to these embodiments that still fall within the spirit and scope of the invention. Use of the system of the present invention may be carried out with a wide range of fluids, from tap water to specialized, non-toxic cleaning baths. Likewise, although the system has been described as finding particular use in washing fruits and vegetables, the operation of the system could benefit the washing or cleaning of a wide variety of objects used in the food preparation industry and elsewhere.

We claim:

1. A system for introducing at least one mass of objects to and removing the at least one mass of objects from a volume of fluid, the system comprising;
    a partially enclosed structure comprising a lower tank portion for holding the volume of fluid and an upper loading portion accessible through a partially open front panel, the partially enclosed structure having a closed top;
    a mechanical system positioned substantially over the closed top of the partially enclosed structure for creating a substantially vertical linear motion for introducing the at least one mass of objects to and removing the at least one mass of objects from the volume of fluid, the mechanical system comprising a drive mechanism statically fixed in position to the partially enclosed structure, a drive linkage operably connected to the drive mechanism, and at least one vertically movable lift rod operably connected to the drive linkage, the at least one vertically movable lift rod extending down through the closed top of the partially enclosed structure;
    a support structure positioned within the partially enclosed structure, the support structure connected to the at least one vertically movable lift rod of the mechanical system through at least one connection point; and at least one permeable structure for holding the at least one mass of objects, the at least one permeable structure removably attachable to or supportable by the support structure.

2. The system of claim 1 further comprising a control means in operable communication with the drive mechanism of the mechanical system.

3. The system of claim 2 wherein the control means is programmable and is programmed to control the direction, speed, and timing of the vertical linear motion for introducing the at least one mass of objects to and removing the at least one mass of objects from the volume of fluid.

4. The system of claim 2 further comprising at least one temperature sensor in signal communication with the control means, wherein a temperature of the volume of fluid is monitored by the control means.

5. The system of claim 4 further comprising a means for adding or removing thermal energy to or from the volume of fluid operably connected to the control means.

6. The system of claim 2 further comprising at least one total dissolved solids sensor in signal communication with the control means, wherein the total dissolved solids within the volume of fluid is monitored by the control means.

7. The system of claim 2 further comprising at least one fluid level sensor in signal communication with the control means, wherein the level of the volume of fluid in the partially enclosed structure is monitored by the control means.

8. The system of claim 2 further comprising a fluid and chemical delivery system in flow communication with the partially enclosed structure and in signal communication with the control means, the fluid and chemical delivery system connected to water and chemical additive sources and comprising a plurality of valves and manifolds for producing a controlled flow of water and/or chemicals into the partially enclosed structure to provide the volume of fluid in the partially enclosed structure, wherein a composition of the volume of fluid is monitored and regulated by the control means.

9. The system of claim 1 further comprising at least one cover panel movably positionable over the partially open front panel of the partially enclosed structure.

10. The system of claim 9 wherein the at least one cover panel is removably secured to the partially open front panel.

11. The system of claim 9 wherein the at least one cover panel is hingedly secured to the partially open front panel.

12. The system of claim 1 wherein the at least one permeable structure slidingly engages the support structure through the partially open front panel of the partially enclosed structure.

13. The system of claim 1 wherein the at least one permeable structure comprises a plurality of permeable structures and the support structure is adapted to separately receive each of the permeable structures through the partially open front panel of the partially enclosed structure.

14. The system of claim 1 further comprising a fluid and chemical delivery system in flow communication with the partially enclosed structure, the fluid and chemical delivery system connected to water and chemical additive sources and comprising a plurality of valves and manifolds for producing a flow of water and/or chemicals into the partially enclosed structure to provide the volume of fluid in the partially enclosed structure.

15. A method of controllably washing, thawing or processing at least one mass of objects in a volume of fluid, the method including the steps of:
selecting a specific predetermined operation for washing, thawing or processing to be performed from a set of predetermined operations;
introducing the volume of fluid into a partially enclosed structure for holding the volume of fluid and monitoring a level of the volume of fluid;
monitoring a temperature of the volume of fluid;
optionally heating or cooling the volume of fluid to achieve a predetermined temperature range based on the selected predetermined operation for washing, thawing or processing being performed;
placing the at least one mass of objects at least partially onto or within at least one permeable structure;
introducing the at least one permeable structure onto or into a support structure positioned within the partially enclosed structure, the support structure operably connected to a mechanical system for creating a substantially vertical linear motion for the at least one permeable structure within the partially enclosed structure for holding the volume of fluid;
performing a repetitive sequence of vertical linear motions imparted to the at least one permeable structure, the sequence defined by the selected predetermined operation for washing, thawing or processing being performed, to move the at least one mass of objects in the at least one permeable structure into, within, and out from the volume of fluid;
continuing to monitor the temperature of the volume of fluid and if required, heating or cooling the volume of fluid as needed to maintain the predetermined temperature range; and
upon completion of the step of performing the sequence of vertical linear motions, removing the at least one permeable structure from the support structure positioned within the partially enclosed structure, and removing the at least one mass of objects from the at least one permeable structure.

16. The method of claim 15 wherein the step of performing a sequence of vertical linear motions includes introducing the at least one mass of objects in the at least one permeable structure to the volume of fluid to predetermined vertical levels based on the selected specific predetermined operation of washing, thawing or processing being performed.

17. The method of claim 15 wherein the step of performing a sequence of vertical linear motions includes pausing the vertical linear motion to allow thermal energy to transfer between the volume of fluid and the at least one mass of objects until a predetermined fluid temperature is reached before continuing.

18. The method of claim 15 wherein the step of performing a sequence of vertical linear motions is deemed completed when a specific temperature is reached in the volume of fluid.

19. The method of claim 15 wherein the step of performing a sequence of vertical linear motions is deemed completed according to a predetermined time frame.

20. The method of claim 15 wherein the step of performing a sequence of vertical linear motions is deemed completed when a specific temperature is reached in the volume of fluid within a predetermined time frame.

* * * * *